(12) United States Patent
Shellhammer

(10) Patent No.: US 8,027,690 B2
(45) Date of Patent: Sep. 27, 2011

(54) METHODS AND APPARATUS FOR SENSING THE PRESENCE OF A TRANSMISSION SIGNAL IN A WIRELESS CHANNEL

(75) Inventor: Stephen J. Shellhammer, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 12/186,500

(22) Filed: Aug. 5, 2008

(65) Prior Publication Data

US 2010/0035557 A1 Feb. 11, 2010

(51) Int. Cl.
*H04W 72/00* (2009.01)
(52) U.S. Cl. ........ 455/454; 455/102; 455/210; 455/228; 375/206; 370/204
(58) Field of Classification Search .................. 455/454, 455/102, 210, 228, 93, 142; 375/206; 704/219; 370/204
See application file for complete search history.

(56) References Cited

U.S. PATENT DOCUMENTS

| | | | | |
|---|---|---|---|---|
| 5,604,730 A * | 2/1997 | Tiedemann, Jr. | | 370/252 |
| 6,014,620 A * | 1/2000 | Handel | | 704/219 |
| 6,498,785 B1 * | 12/2002 | Derryberry et al. | | 370/311 |
| 7,171,165 B2 * | 1/2007 | Azman et al. | | 455/69 |
| 7,428,270 B1 * | 9/2008 | Dubuc et al. | | 375/316 |
| 7,457,295 B2 * | 11/2008 | Saunders et al. | | 370/395.21 |
| 7,480,516 B1 * | 1/2009 | Chen et al. | | 455/522 |
| 7,574,230 B1 * | 8/2009 | Oh et al. | | 455/522 |
| 7,647,065 B2 * | 1/2010 | Au et al. | | 455/522 |
| 7,668,561 B2 * | 2/2010 | Au et al. | | 455/522 |
| 7,684,320 B1 * | 3/2010 | Nucci | | 370/229 |
| 2004/0242158 A1 * | 12/2004 | Fattouch et al. | | 455/63.1 |
| 2005/0020213 A1 * | 1/2005 | Azman et al. | | 455/67.11 |
| 2008/0112467 A1 | 5/2008 | Shellhammer | | |
| 2009/0131047 A1 * | 5/2009 | Amerga et al. | | 455/434 |
| 2010/0075704 A1 * | 3/2010 | McHenry et al. | | 455/509 |

OTHER PUBLICATIONS

First Report and Order and Further Notice of Proposed Rulemaking, FCC 06-156, Oct. 18, 2006.
C. R. Stevenson, et al., Functional Requirements for the 802.22 WRAN Standards, IEEE 802.22-04/0004r46, Sep. 2005.
Chris Clanton et al., Wireless Microphone Signal Simulation Method, IEEE 802.22-07/124r0, Mar. 2007.
S. . Kay and S. L. Marple, Jr., "Spectral Analysis: A Modern Perspective," Proc. IEEE vol. 69, pp. 1380-1419, Nov. 1981.

(Continued)

*Primary Examiner* — Minh D Dao
(74) *Attorney, Agent, or Firm* — D. Scott Juneau

(57) ABSTRACT

Methods and apparatus for sensing the presence of a transmission signal type within a wireless channel in a wireless communication system, such as those including the use of wireless microphones, are described. Sensing the transmission signal type includes calculating a spectral density estimate of a signal on the wireless channel. A first test value, derived from the calculated spectral density estimate, is compared to a first threshold. A preliminary determination of the presence of the transmission signal type is made if the first test value exceeds the first threshold. Sensing the presence of the signal type after preliminary determination of the presence of the signal type is made by determining that an observed spectral density of a prescribed signal added to the signal on the wireless channel matches a model estimate of the spectral density of the prescribed signal to a sufficient degree.

36 Claims, 6 Drawing Sheets

OTHER PUBLICATIONS

H. W. Sorenson, Parameter Estimation: Principles and Problems, 1980, pp. 33-40, Marcel Dekker Inc., New York.

Guanbo Zheng et al: "Enhanced Energy Detector for IEEE 802.22 WRAN Systems Using Maximal-to-Mean Power Ratio" Wireless Communication Systems, 2007. ISWCS 2007. 4th International Symposium on, IEEE, Piscataway, NJ, USA, Oct. 1, 2007, pp. 370-374, XP031166793 ISBN: 978-1-4244-0978-5 paragraphs I. & III.

International Search Report & Written Opinion—PCT/US2009/052594, International Search Authority—European Patent Office—Dec. 8, 2009.

S.J. Shellhammer: "Spectrum sensing in IEEE802.22" First Workshop on Cognitive Info. Process. (CIP 2008) Jun. 9, 2008, Jun. 10, 2008, XP002557132 Retrieved from the Internet: URL:http://www.eurasi p.org/Proceedi ngs/Ext /CIP2008/papers/1569094657.pdf> [retrieved on Nov. 23, 2009] paragraphs [06.4]-[06.6].

S.Y. Chang: Schemes" "Analysis of Proposed Sensing 1-36 Mar. 6, 2006, XP002557133 Retrieved from the Internet: URL:http://www.1eee802.org/22/Meeti ng_docu ments/2006_Mar/22-06-0005-05-0000_ETRI-FTI2R- Motorola-Philips-Samsung-Thomson_Proposal.ppt> [retrieved on Nov. 23, 2009] p. 54-p. 63.

\* cited by examiner

METHODS AND APPARATUS FOR SENSING THE PRESENCE OF A TRANSMISSION SIGNAL IN A WIRELESS CHANNEL

BACKGROUND

1. Field

The present disclosure generally relates to methods and apparatus for sensing the presence of a transmission signal in a wireless channel, and more particularly to spectrum sensing of a particular transmission signal type in the wireless channel.

2. Background

In particular wireless networks including cognitive radio technology operating according to IEEE standard 802.22, as an example, unlicensed wireless operation is permitted in unused television channels. In order to prevent operation in channels that are currently used by licensed wireless devices at a given time, user devices in such networks preferably need the ability to observe the spectrum and identify channels that are occupied by licensed users or other users. As an example, it is noted that the licensed users may be Advanced Television Systems Committee (ATSC) digital television transmissions, National Television Systems Committee (NTSC) analog television transmission or licensed wireless microphone transmissions. The process of observing the wireless spectrum and identifying occupied and unoccupied TV channels is referred to as "spectrum sensing." This spectrum sensing capability is often one of the capabilities of cognitive radio devices in order to identify unused frequency bands in the RF spectrum that may be used by the devices.

Presently the Institute of Electrical and Electronics Engineers (IEEE) is developing a standard for unlicensed wireless networks (e.g., working group IEEE 802.22) that operate in the television bands. This standard will utilize cognitive radio techniques for sensing the presence of particular signals, such as wireless microphone signals, in order to identify unused TV channels, for example. It is noted that there are several possible licensed transmissions that may occupy a TV channel, such as analog TV, and Advanced Television Systems Committee (ATSC) digital TV, as well as professional wireless microphones.

Licensed wireless microphones operating in the television bands, in particular, are typically analog FM devices. The bandwidth of these devices is limited to less than 200 kHz, with a typical bandwidth being even narrower at approximately 100 kHz. Since these devices utilize FM modulation, the bandwidth of the transmission depends on the amplitude of the audio signal. Accordingly, it known that some manufacturers of wireless microphones add a high-frequency tone into the audio signal before modulation to assist intended receivers of that signal in identifying the wireless microphone transmission given the relatively narrow-band signal. This high-frequency tone is referred to as a "tone-key," allows the receiver to squelch the audio signal when no signal is present.

Devices within the above-described systems may scan a frequency spectrum of the wireless channels in order to attempt to identify unused spectrum. Certain types of transmissions may not be accurately detected by merely scanning the frequency spectrum. With wireless microphones, in particular, because the volume of an attendant audio tone-key signal causes fluctuations in the bandwidth of the particular wireless microphone signal, frequency scanning may be difficult. As such, benefits may be realized by methods and apparatus with improved accuracy in detecting the presence of a particular transmission signal in a wireless channel.

SUMMARY

According to an aspect, a method for sensing the presence of a transmission signal type within a wireless channel in a wireless communication system is disclosed. The method includes calculating a spectral density estimate of a signal on the wireless channel, and comparing a first test value derived from the calculated spectral density estimate to a first threshold; making a preliminary determination of the presence of the transmission signal type if the first test value exceeds the first threshold. Additionally, the method includes sensing the presence of the signal type after a preliminary determination of the presence of the signal type is made by determining that an observed spectral density of a prescribed signal added to the signal on the wireless channel matches a model estimate of the spectral density of the prescribed signal by at least a predetermined degree.

According to another aspect, an apparatus operable for sensing the presence of a transmission signal type within a wireless channel in a wireless communication is disclosed. The apparatus includes a memory storing instructions executable by a processor. Furthermore, the apparatus includes at least one processor configured to execute the instructions stored in the memory. The instructions include instructions causing the processor to calculate a spectral density estimate of a signal on the wireless channel, and compare a first test value derived from the calculated spectral density estimate to a first threshold, and make a preliminary determination of the presence of the transmission signal type if the first test value exceeds the first threshold. The instructions also cause the processor to sense the presence of the signal type after a preliminary determination of the presence of the signal type is made by determining that an observed spectral density of a prescribed signal added to the signal on the wireless channel matches a model estimate of the spectral density of the prescribed signal by at least a predetermined degree.

According to yet another aspect, another apparatus operable for sensing the presence of a transmission signal type within a wireless channel in a wireless communication is disclosed. This apparatus includes means for calculating a spectral density estimate of a signal on the wireless channel, and means for comparing a first test value derived from the calculated spectral density estimate to a first threshold. The apparatus further includes means for making a preliminary determination of the presence of the transmission signal type if the first test value exceeds the first threshold; and means for sensing the presence of the signal type after a preliminary determination of the presence of the signal type is made by determining that an observed spectral density of a prescribed signal added to the signal on the wireless channel matches a model estimate of the spectral density of the prescribed signal by at least a predetermined degree.

According to yet one further aspect, a computer program product comprising a computer-readable medium is disclosed. The medium includes code for causing a computer to calculate a spectral density estimate of a signal on the wireless channel, and code for causing the computer to compare a first test value derived from the calculated spectral density estimate to a first threshold; code for causing the computer to make a preliminary determination of the presence of the transmission signal type if the first test value exceeds the first threshold. The medium further includes code for causing the computer to sense the presence of the signal type after a preliminary determination of the presence of the signal type is made by determining that an observed spectral density of a prescribed signal added to the signal on the wireless channel matches a model estimate of the spectral density of the prescribed signal by at least a predetermined degree.

DETAILED DESCRIPTION

Method and apparatus for detecting the presence of a particular transmission signal in a wireless channel are disclosed that take advantage of spectral characteristics in the transmission signal to improve the detection accuracy. In one example of narrow-band transmissions such as wireless microphone transmissions, the effects of an added tone-key may be analyzed to validate a determination that a wireless microphone signal type is present in a wireless channel to increase detection accuracy.

Figure 1:
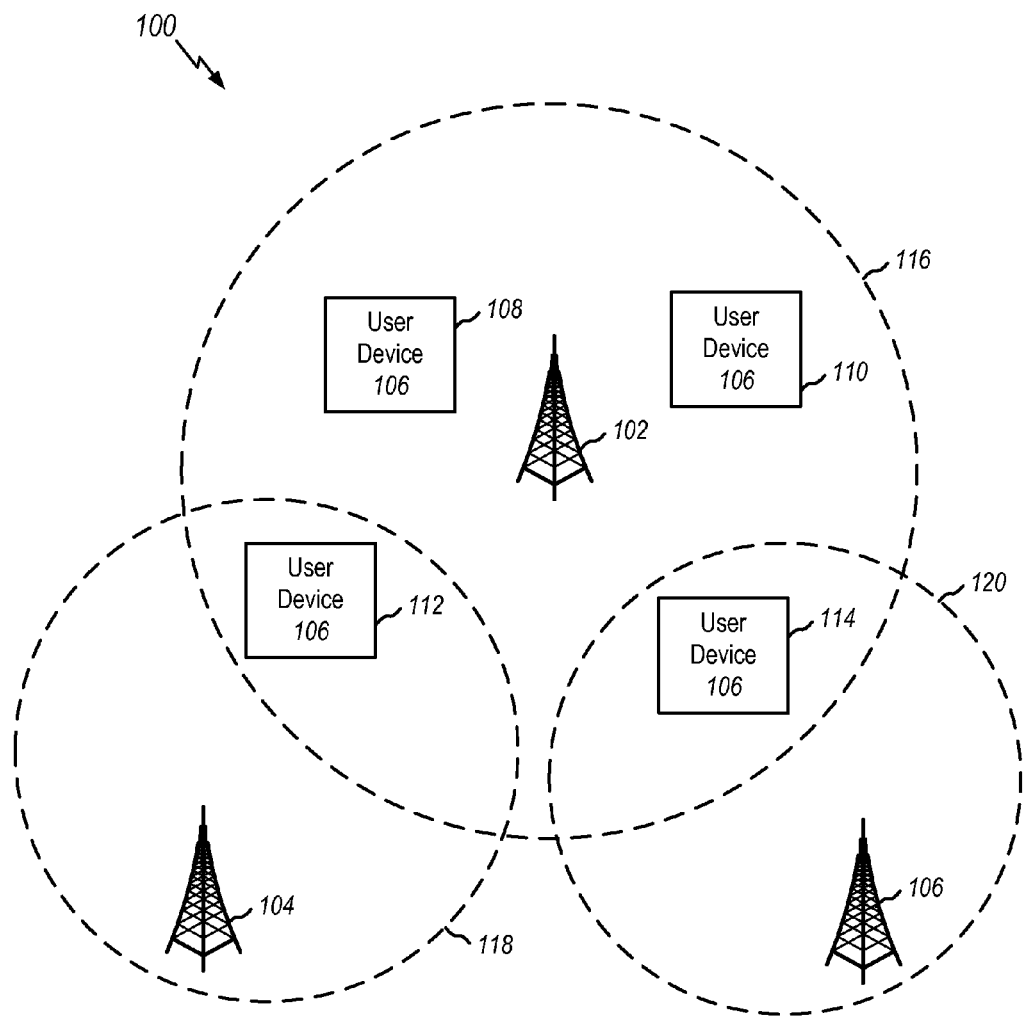
FIG. 1 is a communication network in which the presently disclosed methods and apparatus may be employed.

FIG. 1 illustrates a communication network 100 in which the presently disclosed methods and apparatus may be employed. The network 100 includes a plurality of base stations 102, 104, 106 and a plurality of user devices 108, 110, 112, 114. The user devices 108, 110, 112, 114 may be cognitive radio devices, wireless devices, mobile stations, or other similar devices. The network 100 also includes a plurality of service areas 116, 118 120, which may be effected by the base stations 102, 104, 106, respectively. A first service area 116 includes a first base station 102 and the plurality of user devices 108, 110. The first service area 116 may be overlapped with one or more other service areas. For example, in FIG. 1 the first service area 116 is overlapped by a second service area 118 and a third service area 120. As shown, some user devices may be located in a service area that is overlapped by a different service area.

The plurality of base stations 102, 104, and 106 may provide service to the user devices located in their respective service area. For example, the first base station 102 may provide services to and perform communications with the user devices located in the first service area 116 (e.g., 108, 110, 112, 114). Each of the plurality of user devices 108, 110, 112, 114 may scan the band of frequencies utilized by one or more base stations 102, 104, 106 as well as the frequencies used by other user devices. A user device that is located in an overlap area between two service areas may scan the frequency band utilized by each base station providing service in the overlap area. Each of the user devices may also sense whether a channel is occupied by a licensed transmission. For example, each user device may sense whether the RF spectrum is currently occupied by a licensed ATSC digital television transmissions, NTSC analog television transmissions, or wireless microphone transmissions. As discussed above, unoccupied channels may be used for unlicensed wireless network operations by user devices (e.g., user devices 108, 110, 112, and 114). In particular, the user devices may comprise devices such as cognitive radio devices.

Figure 2:
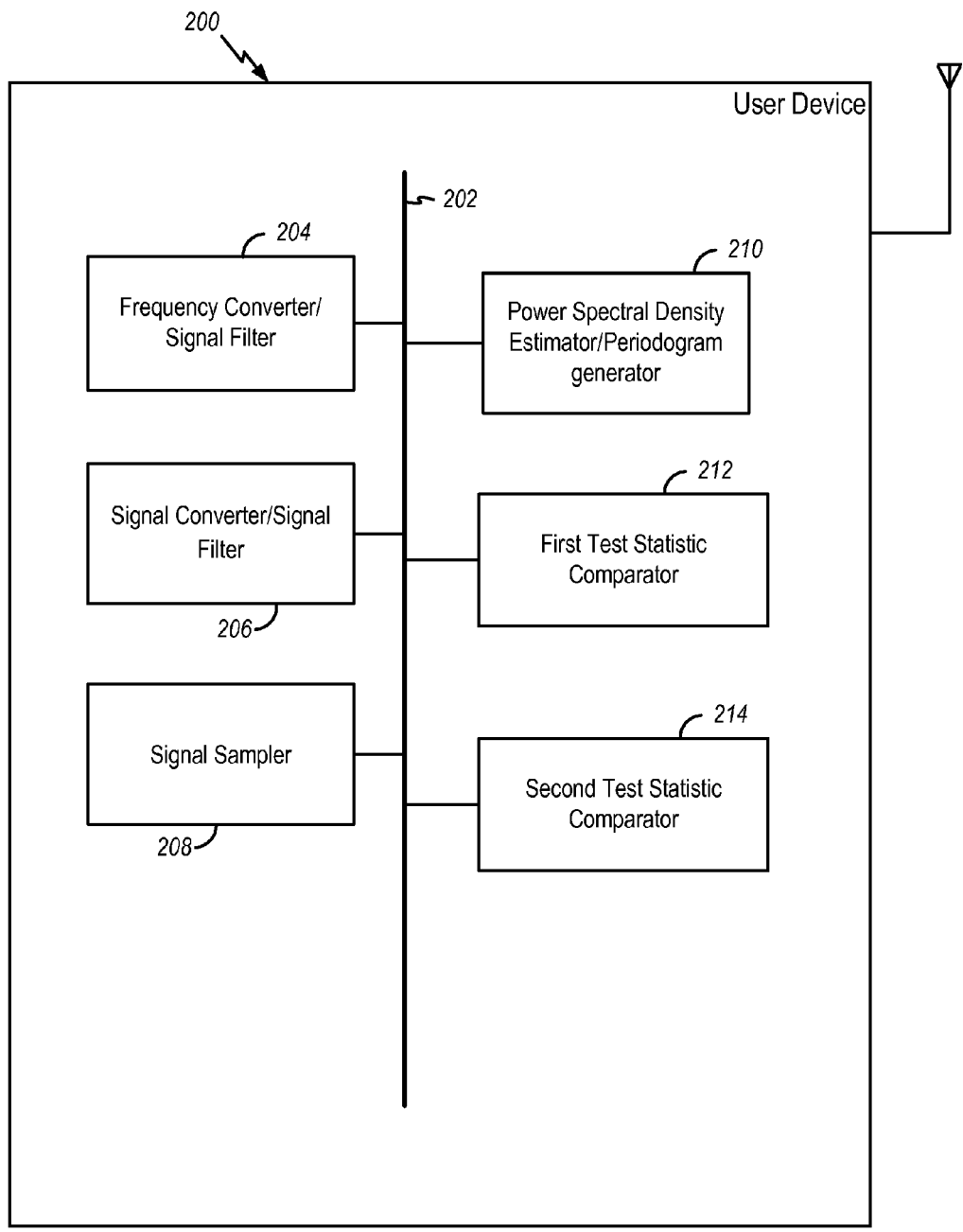
FIG. 2 is an exemplary user device that may be used in the system of FIG. 1 for detecting the presence of a particular signal type.

FIG. 2 illustrates an exemplary user device 200 that may be used in the system of FIG. 1, for example. It is noted that device 200 may be analogous to the user devices 108, 110, 112, 114 in FIG. 1. User device 200 includes a number of various functional modules for effecting respective functions for spectrum sensing of particular signal types (e.g., ATSC, NTSC, or licensed wireless transmissions). The various modules are shown communicatively coupled with a central data bus 202, or similar device for communicatively linking the several modules together.

Figure 3:
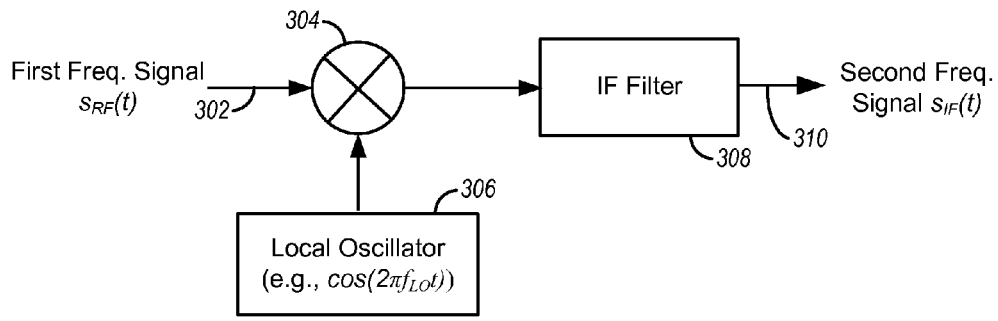
FIG. 3 illustrates an apparatus that may be used in the device of FIG. 2 for conversion of an RF signal to an IF signal.

User device 200 includes a frequency converter/signal filter 204, which serves to down convert a particular radio frequency (RF) signal of a channel of interest received by user device 200, for example, to an intermediate frequency (IF) signal and then filter the IF signal. An exemplary circuit configuration to effect the function of module 204 is illustrated by FIG. 3. As shown in FIG. 3, a first frequency signal $s_{RF}(t)$ 302 received by user device 200 is fed to a mixer 304. The signal 302 may be an RF signal as denoted by $s_{RF}(t)$. It is noted that in the case where the first signal 302 is from a television channel that is the channel of interest, different RF frequencies corresponding to different television channel may be selected to input to mixer 304.

Mixer 304 is coupled to a local oscillator 306, which provides a sinusoidal signal to be mixed with signal 302 in order to achieve down conversion. The frequency of local oscillator 306 is selected so that the signal of interest 302 is converted down to the IF frequency. In particular, the sinusoidal signal may be $\cos(2\pi f_{LO} t)$ where the frequency $f_{LO}$ represents the difference between the first RF frequency of signal 302 and the IF frequency to which signal 302 is converted.

The down converted signal is then filtered with a signal filter 308, which performs IF filtering having a predetermined bandwidth sufficient to capture the entire channel of interest. The resulting signal after filtering by filter 308 is termed the IF signal or a second frequency signal $s_{IF}(t)$ 310.

Figure 4:
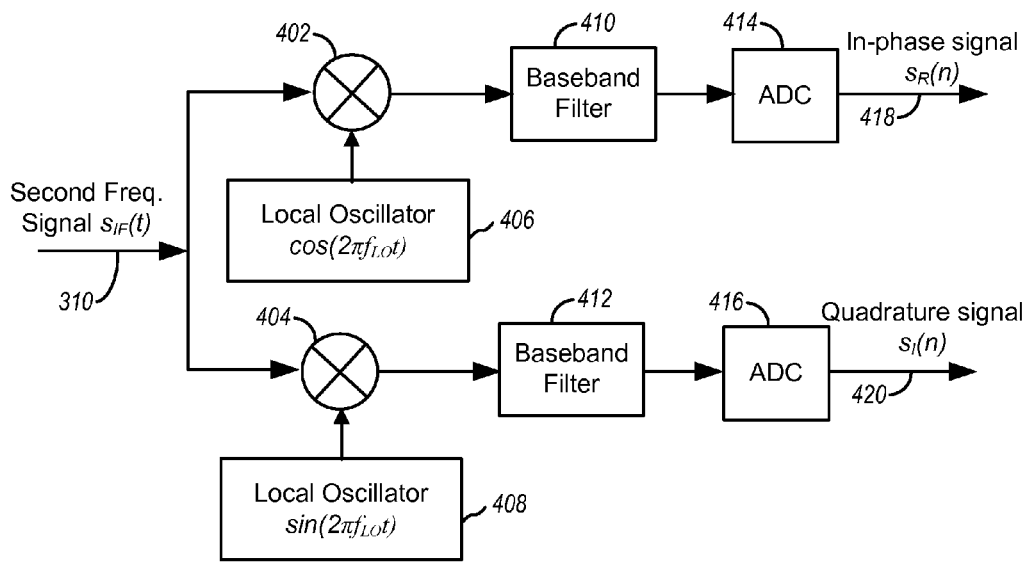
FIG. 4 illustrates an apparatus that may be used in the device of FIG. 2 for conversion of an IF signal to a baseband signal.

Turning back to FIG. 2, the user device 200 further includes a signal converter/signal filter module 206 that functions to down convert the IF signal from frequency converter 204 (e.g., signal 310) to a baseband signal, and to filter the signal. In a particular aspect, the IF signal is converted to a complex base-band signal using a complex down conversion, filtering, and sampling. An exemplary circuit for effecting the functionality of module 206 is illustrated in FIG. 4. As shown, second frequency signal $s_{IF}(t)$ 310 is input to a first and a second mixer 402 and 404. The first mixer 402 mixes the second frequency signal $s_{IF}(t)$ 310 with a sinusoidal signal from a first local oscillator 406, which is in-phase (i.e., $\cos(2\pi f_{LO} t)$). The second mixer 404 mixes the second frequency signal $s_{IF}(t)$ 310 with a sinusoidal signal from a second local oscillator 408, where the sinusoidal signal from the second local oscillator 408 is a quadrature component (i.e., $\sin(2\pi f_{LO} t)$).

The respective down converted in-phase and quadrature signals from the first and second mixers 402 and 404 are fed to first and second baseband filters 410 and 412, respectively.

The filtered signals from the first and second baseband filters 410 and 412 are, in turn, fed to first and second analog-to-digital converters (ADCs) 414 and 416 for conversion from time-based signals to digital signals. According to a particular aspect, the first ADC 414 is used on the in-phase signal and the second ADC 416 is used on the quadrature signal. It is noted that the sampling rate used in the ADCs 414, 416 is typically the same, or slightly larger than the bandwidth of the complex baseband signal. After conversion by the ADCs 414, 416, the output baseband signal is a complex signal consisting of both an in-phase (real) component $s_R[n]$ 418 and a quadrature (imaginary) component $s_I[n]$, as quantified by the following equation:

$$s[n] = s_R[n] + js_I[n] \qquad (1).$$

Referring back to FIG. 2, user device 200 further includes a signal sampler 208, which is used to sample the complex base-band signal in order to determine a power spectral density (PSD) estimate. According to an exemplary aspect, the sampler 208 may sense complex baseband signal 418, 420 over a sequence of time intervals where the time intervals are separated in time. Using a sequence of separate sensing intervals may be beneficial in that during sensing it is common to stop network transmissions to avoid interfering with the spectrum sensing process. Another benefit may be that in the case of wireless microphones, such devices when transmitting typically alternate between voiced and unvoiced operation, and the spectrum during unvoiced operation has a narrower bandwidth than in the voiced state. By separating the sensing intervals in time the probability is increased that some of the sensing intervals will occur during an unvoiced state. Sensing during an unvoiced state may better afford the sensing receiver to sense lower power wireless microphone signals.

Figure 5:
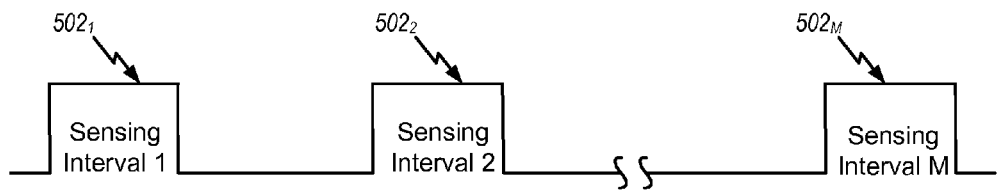
FIG. 5 illustrates of a sequence of separate sensing intervals that may be effected by apparatus in FIG. 2 for sampling a wireless signal.

FIG. 5 provides an illustration of a sequence of separate sensing intervals 502. In an example, there are may be a total of M number of sensing intervals. Between each of the sensing intervals $502_1, 502_2, \ldots, 502_M$, no sensing is performed. In a further aspect, the spacing between sensing intervals 502 may be selected to allow wireless access between sensing intervals 502, as well as increase the probability that some of the sensing intervals observe an unvoiced period of the transmitting device, such as a wireless microphone.

It is further noted that the sampler 208 in FIG. 2 may be further configured to sample a predetermined N number of complex samples of the baseband signal 418, 420 for each sensing interval 502. The N samples collected during each interval 502 may be sent from the sampler 208 to a power spectral density estimator/periodogram generator 210. Accordingly, for each interval 502 consisting of N samples, the estimator 210 will calculate a power spectral density estimate of the channel of interest using the N number of samples. In an example, this estimate may be calculated as the absolute value of a Discrete Fourier Transform (DFT) of the N samples. It is noted that DFT may be implemented using a Fast Fourier Transform (FFT). It is also noted that the bandwidth of the window for the FFT of the N samples is selected to a sufficiently small bandwidth to increase the likelihood that a peak value indicative of the signal of interest may be found.

By using multiple intervals (e.g., the M number of intervals 502), the estimate of the power spectral density of the signal may be improved by averaging the individual estimates calculated for each interval 502.

For a specific frequency ω, an exemplary Periodogram may be determined based on the relationship given in Equation (2) as follows:

$$P_{PER}(\omega) = \frac{1}{M} \left| \sum_{m=0}^{M-1} x(m)\exp(-j\omega m) \right|^2 \qquad (2)$$

where $P_{PER}$ is the power spectral density estimate or Periodogram, M is the number of intervals or FFTs calculated, and x(m) is power spectral density estimate determined for each respective m-th interval. As may be recognized from equation (2), calculating $P_{PER}$ involves taking M number of FFTs, one for each m-th interval, and then determining the absolute value of the FFT results and averaging those absolute values over all M intervals.

The power spectral estimator/periodogram generator 210 may also be configured to determine or calculate a discrete version of the average power spectral estimate or Periodogram discussed above. It is noted that the baseband signal 418, 420 for an m-th sensing interval may be given by $s_m[n]$ for an n-th sample where n=0,1, ... N−1. Accordingly, the discrete FFT of the baseband signal for the m-th sensing interval is then given by $X_m[k]$ for k=0,1, ... N−1. Thus, the discrete version of the average power spectral estimate X[k] over M sensing intervals is given by the following equation:

$$X[k] = \frac{1}{M} \left| \sum_{m=0}^{M-1} X_m[k] \right|^2 \text{ for } k = 0,1, \ldots N-1 \qquad (3)$$

Referring again to FIG. 2, user device 200 also includes a first test statistic comparator 212, which utilizes the average power spectral estimate in order to detect the presence of a particular signal type. In particular the comparator 212 may determine or select a predetermined test statistic based on X[k] above to detect a signal type in a channel of interest, such as the presence of wireless microphone signal, as an example. According to an example, a test statistic may be selected based on a ratio of a maximum value of the average power spectral density estimate among the N number of values to the average of the N number of values in the power spectral estimate X[k]. Quantitatively, this first test statistic $T_1$ may be given as:

$$T_1 = \frac{\max_k (X[k])}{\left(\frac{1}{N} \sum_{k=0}^{N-1} X[k]\right)}. \qquad (4)$$

After determination of the first test statistic $T_1$, the comparator 212 then compares the first test statistic $T_1$ to a first predetermined threshold value $\gamma_1$. If the first test statistic $T_1$ exceeds the threshold $\gamma_1$ (i.e., $T_1 > \gamma_1$) then the comparator 212 (or other similar processing module) decides that a particular signal type (e.g., a wireless microphone signal transmission) is present in the channel of interest. Conversely, if the first test statistic does not exceed the threshold (i.e., $T_1 \leq \gamma_1$) then the comparator 212 decides that the signal type is not present in the channel. It is noted that the value of the first threshold $\gamma_1$ may be selected to ensure that the proper false alarm rate is below a desired level. It is further noted that the first test statistic may be considered a preliminary determination of the presence of the signal type, and that further validation may be performed to ensure an accurate sensing of the signal type, as will be discussed below.

After the preliminary determination by the comparator 212, if a signal is detected there is a possibility it is of the signal type of interest (e.g., a wireless microphone), but there is also a possibility that it is another signal type. Accordingly, user device 200 may include another functional module to validate or test whether the preliminary determination from comparator 212 is accurate. Thus, user device 200 includes a second test statistic comparator 214, which functions to execute one or more tests that can be performed to validate the preliminary sensing of a signal type is in fact the signal type (e.g., a wireless microphone signal).

In an exemplary implementation, the second comparator 214 may be configured to ensure or validate that the detected signal is not the pilot of an ATSC signal. In one example, validation may be performed by comparing the frequency of the strongest peak in the average power spectral density calculated by module 210 with an expected frequency of the ATSC pilot frequency. If the difference in frequency between the two is greater than a prescribed threshold, the signal can be determined as not being an ATSC pilot signal and, thus, is more likely a signal of interest, such as a wireless microphone signal.

Figure 6:
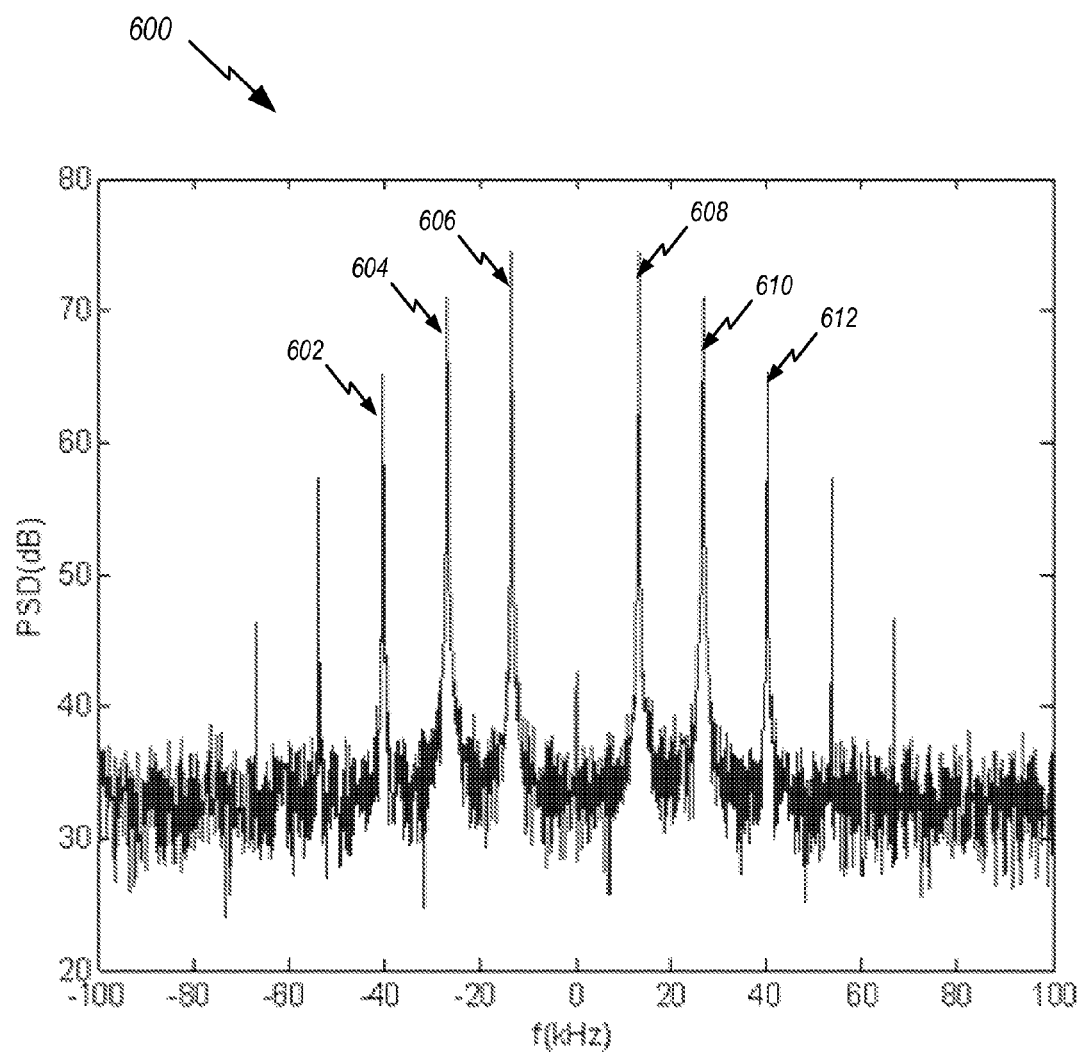
FIG. 6 is an exemplary plot of a characteristic spectrum of an FM wireless microphone with only a tone-key present on the audio input.

In another exemplary implementation, the second comparator 214 may be configured to validate that the preliminary determination of the particular signal type based on spectral characteristics of a prescribed signal added to the signal type. In the particular case of a wireless microphone signal, the known spectral characteristics may be those when only a tone-key audio input is present. An exemplary plot of a characteristic spectrum of an FM wireless microphone with only a tone-key present on the audio input is illustrated in FIG. 6. As may be seen, the spectrum plot 600 is a plot of the power spectral density (PSD) over a range of frequencies on each side of a center frequency (0 kHz). The plot also consists of a number of peaks, such as 602, at particular frequencies. As may be observed from the plot 600, the amplitude of the frequency components decays as the frequency separation from the center frequency increases, which is due to the FM modulation characteristics.

In order to validate the preliminary determination, the second comparator 214 may be configured to select a particular number N of the largest peaks in the power spectrum. According to an aspect, if the characteristic spectrum is of a signal in which the center frequency (i.e., 0 kHz) is absent, then N would be selected by the second comparator 214 to be an even number. Correlatively, if the spectrum is one in which the center frequency is present, comparator 214 would then set N to be odd to select the center frequency as well as the largest frequency peaks above and below the center frequency.

As an example where the center frequency is absent, if N is set to 6 using the exemplary spectrum plot of FIG. 6, then the three strongest peaks below the center frequency (e.g., 602, 604, 606) would be selected, as well as the three largest peaks above the center frequency (e.g., 608, 610, 612). It is noted that when no noise is present, a relationship between these frequency peaks is typically a separation by a fixed frequency value, except for the middle two (606, 608) which are separated by twice that frequency due to lack of a peak at the center frequency. It is noted in the case where a center frequency is present and N would be an odd number, then such separation of twice the frequency would not be applicable.

Accordingly, starting from the frequency of the lowest frequency peak in the N number of peaks (e.g., 602 in FIG. 6), this frequency is assigned a value $f_0$. As mentioned above, the relationship between frequency peaks is typically separation by a fixed value, which is termed herein $f_1$. Accordingly, each the peaks, as the peaks increase from lowest frequency $f_0$ to highest frequency, each successive peak may be described in terms of the relationship to the lowest frequency $f_0$ and the fixed separation value $f_1$. Accordingly, in the example of N=6, the peaks 602 through 612 it may be written as $f_0, f_0+f_1, f_0+2f_1, f_0+4f_1, f_0+5f_1$, and $f_0+6f_1$, respectively.

Due to noise (represented as n for purposes of the following discussion) the frequency of the actual peaks in the power spectral density will have some errors. Letting y be an observation vector represent the frequencies of the N largest peaks from lowest to highest in frequency with added noise n then $y_1=f_0+n_1, y_2=f_0+f_1+n_2, y_3=f_0+2f_1+n_3$, and so forth. The observed frequencies from estimator 210 are thus correct frequencies with some added noise. Thus, as may be recognized, the observation vector y is a linear function of $f_0$ and $f_1$ and noise n. The following equation (5) is a numerical example for the case where N=6 and a center frequency is not present due to the choice of the frequency of the tone key for a wireless microphone, for example.

$$\begin{pmatrix} y_1 \\ y_2 \\ y_3 \\ y_4 \\ y_5 \\ y_6 \end{pmatrix} = \begin{pmatrix} 1 & 0 \\ 1 & 1 \\ 1 & 2 \\ 1 & 4 \\ 1 & 5 \\ 1 & 6 \end{pmatrix} \begin{pmatrix} f_0 \\ f_1 \end{pmatrix} + \begin{pmatrix} n_1 \\ n_2 \\ n_3 \\ n_4 \\ n_5 \\ n_6 \end{pmatrix} \quad (5)$$

Equation (5) can simply be rewritten in shorthand form as follows:

$$y = H \begin{pmatrix} f_0 \\ f_1 \end{pmatrix} + n \quad (6)$$

where H represents the matrix of the relationship of the frequency peaks in terms of $f_0$ and $f_1$, and n is a vector of noise terms. In the example of equation (5) above, the particular values for the H matrix are specific to the case of N=6.

After determining vector y, comparator 214 may be further configured to find model estimates of $f_0$ and $f_1$ from the observation vector y. That is, model estimates may be found from the numerical data obtained from observation vector y by adjusting the parameters of a model to get an optimal fit of the data. In an aspect, comparator 214 may employ an estimator using a least-squares estimate to find these model estimate values as given by the following relationship:

$$\begin{pmatrix} \hat{f}_0 \\ \hat{f}_1 \end{pmatrix} = (H^T H)^{-1} H^T y \quad (7)$$

where $H^T$ is the transpose of matrix H and the values $\hat{f}_0$ and $\hat{f}_1$ are the model estimated values for $f_0$ and $f_1$. It is noted that one skilled in the art will appreciate that the present disclosure is not limited to a least-squares estimation and that any number of suitable regression analysis or estimation techniques may employed to find the model estimates for $f_0$ and $f_1$.

Given the model estimates $\hat{f}_0$ and $\hat{f}_1$ for the two frequencies for $f_0$ and $f_1$ a determination of how well this model or characteristic based on the matrix H fits the observed data can be made. In an aspect, this determination may be made by estimating what the model yields for the original observed data and comparing that estimate to the original observed data.

Accordingly, a model estimation of what the estimates $\hat{f}_0$ and $\hat{f}_1$ yield for the original vector y may be determined as follows:

$$\hat{y} = H \begin{pmatrix} \hat{f}_0 \\ \hat{f}_1 \end{pmatrix}. \tag{8}$$

where $\hat{y}$ is the estimate of the model characteristics or parameters.

A second test statistic or metric $T_2$ may be determined by then quantitatively calculating how closely the observed vector y of the N largest frequency peaks fits or matches the estimated model vector $\hat{y}$ (i.e., the known or expected PSD characteristic). In an example, the degree of how closely the observed data matches the model may be ascertained by determining the second test statistic $T_2$, which may be a calculation of the mean square error between the two vectors according to the following equation:

$$T_2 = \|y - \hat{y}\|^2 = \sum_{i=1}^{N} (y_i - \hat{y}_i)^2 \tag{9}$$

where $\|y-\hat{y}\|$ represents the norm of the vector difference of y and $\hat{y}$. The smaller the value of $T_2$, the better the two vectors match in their characteristics. Accordingly, the second comparator 214 may be configured to compare this test statistic $T_2$ to a predetermined threshold $\gamma_2$ where if the test statistic is less than the predetermined threshold ($T_2 \leq \gamma_2$), then it is likely that the signal of interest is of the particular signal type (e.g., a wireless microphone signal) since the model of the frequency peaks matches the observed power spectral density. Conversely, if the test statistic exceeds the threshold ($T_2 > \gamma_2$), then the signal of interest is most likely not of the particular signal type.

It is noted here that the functional modules shown in user device apparatus 200 may be implemented by one or more processors within the user device, or any other suitable processor such as a digital signal processor (DSP). Moreover, hardware, software, firmware, or combinations thereof may implement the above-described functions of the various modules in user device 200.

Figure 7:
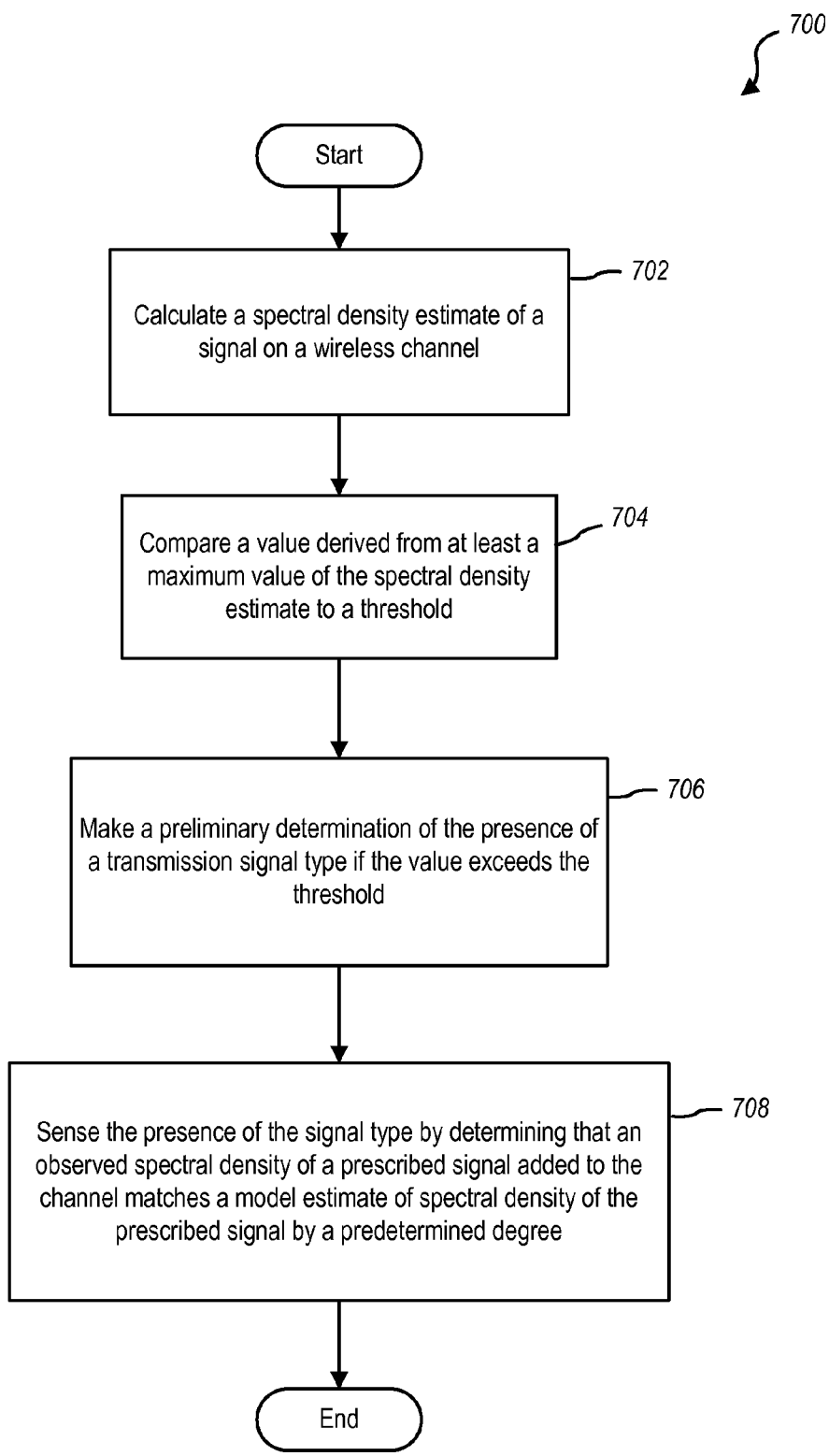
FIG. 7 is a flow diagram of a method for sensing the presence of a transmission signal type within a wireless channel.

FIG. 7 illustrates a method for sensing the presence of a transmission signal type within a wireless channel that may be employed by the apparatus of FIG. 2, for example. The method 700 includes first calculating a spectral estimate of a signal of a wireless channel 702, such as a wireless channel received by a user device as discussed herein. For example, the spectral density estimate may be the power spectral density estimate $P_{PER}$ or estimate X[k] as discussed previously in connection with equations (2) and (3), which may further be determined by the power spectral estimator 210. After the spectral density estimate is determined, a value derived from at least a maximum value of that estimate is compared to a first threshold amount as illustrated in block 704. The value derived may be the first test statistic $T_1$, as discussed previously with respect to equation (4), which is determined using a maximum of X[k], and the first threshold amount $\gamma_1$. Further, comparator 212, as an example, may effect the operation of block 704.

Based on the comparison in block 704, a preliminary determination may be made that a particular transmission signal type is present if the value exceeds the first threshold (e.g., $T_1 > \gamma_1$) as shown in block 706. First test statistic comparator 212, as an example, may perform this operation in block 706.

If a preliminary determination has been made that the transmission signal type is present in the wireless channel in block 706, the presently disclosed methodology may include one or more tests to finally sense the presence of a particular signal type, such as a wireless microphone signal, through a validation process. As an example, method 700 may include block 708 where sensing of the presence of the particular signal type is made by validating the preliminary determination of block 706.

Validation in block 708 may be accomplished by determining that an observed spectral density of a prescribed signal added to the channel matches a model estimate of spectral density of the prescribed signal by at least a predetermined degree. It is noted that in an example the prescribed signal may be a wireless microphone signal modulated by an audio tone-key signal. Furthermore, the process of block 708 may include determining the model estimated spectral density of the prescribed signal using a regression analysis such as a least-squares estimation, as was exemplified in the discussion above in connection with equations (7) and (8).

Moreover, the determination in block 708 of the matching of the observed spectral density of the prescribed signal added to the estimate of spectral density of the prescribed signal may be accomplished in the manner discussed previously with respect to equation (9) and the determination of the second test statistic $T_2$. In addition, determination of matching to the predetermined degree may be implemented by comparison of the test statistic to the second threshold $\gamma_2$. That is, when the second test statistic $T_2$ is less than the second threshold, this indicates that the matching of the observed and estimated spectral densities is at a predetermined degree to validate that the presence of the signal type of interest. It is noted that the processes of block 708 may be implemented by the functional block indicated as the second test statistic comparator 214 in FIG. 2, as an example. It is also noted that one skilled in the art will appreciate that the processes of block 708 are applicable to a wide range of signal types with known attendant spectral characteristics, and is not limited to only spectral characteristics of a wireless microphone transmission modulated by an audio tone-key signal, as illustrated in FIG. 6.

With respect to the method 700, it is also noted that prior to the processes of block 708, an additional validation may be effected (not shown in FIG. 7). This additional validation, in particular, is a validation of the preliminary determination of the presence of the signal type determined in block 706. As was discussed previously, this validation may include comparing a frequency of a determined strongest peak of the power spectral density with an expected frequency of another signal type; namely, the expected frequency of a pilot of an ATSC signal in the example of detection of a wireless microphone signal. It is noted, however, that one skilled in the art will appreciated that this validation may be applied to other signal types and is not limited merely to an ATSC pilot.

Figure 8:
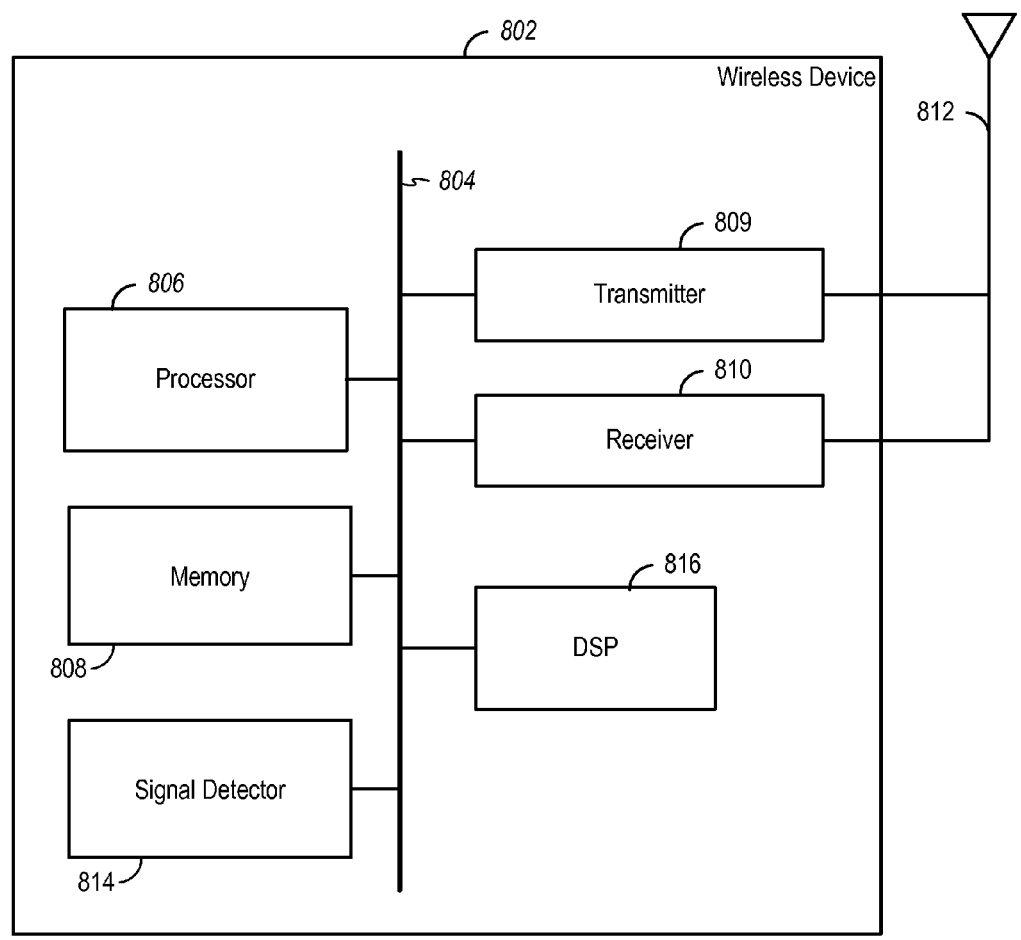
FIG. 8 illustrates various components that may be utilized in a wireless device that employs sensing the presence of a transmission signal type.

FIG. 8 illustrates various components that may be utilized in a wireless device 802. The wireless device 802 is an example of a device that may be configured to implement the various methods described herein. Wireless device 802 may be implemented as a base station, such as base stations 102, 104, 106 in FIG. 1 or a user device, such as user devices 108, 110, 112, 114, also shown in FIG. 1, as two examples.

The wireless device 802 may include a number of various components communicatively coupled by a communication bus 804, which may include a power bus, a control signal bus, a status signal bus, a data bus, any combination thereof, or any other suitable communication link. Device 802 includes a processor 806 that controls operation of the wireless device 802. The processor 806 may also be referred to as a central processing unit (CPU). Device 802 also includes a memory 808, which may include both read-only memory (ROM) and random access memory (RAM) that provides instructions and data to the processor 806. A portion of the memory 808 may also include non-volatile random access memory (NVRAM), as an example. The processor 806 is configured to perform logical and arithmetic operations based on program instructions stored within memory 808. Moreover, the instructions in memory 808 may be executable to implement the methods described herein.

The wireless device 802 may also include a transmitter 809 and a receiver 810 to allow transmission and reception of wireless signals between the wireless device 802 and another wireless device, for example. One or more antennas 812 may be communicatively coupled to the transmitter 809 and receiver 810 as illustrated in FIG. 8. It is noted that wireless device 802 may include multiple transmitters, multiple receivers, and/or multiple antennas.

The wireless device 802 may also include a signal detector 814 that may be used to detect and validate the presence of signals received by the device 802 via receiver 810. The signal detector 818 may be configured to perform the functions and methods described herein, and may perform those functions effected by the functional blocks of the user device 200 in FIG. 2. The wireless device 802 may also include a digital signal processor (DSP) 816 for use in processing signals received. It is also noted that either the processor 806 and/or the DSP 816 may subsume some or all of the functions performed by signal detector 814, as alternative implementations.

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining, and the like. In addition, "determining" can include receiving (e.g., receiving information), accessing (e.g., accessing data in a memory), resolving, selecting, choosing, establishing, and the like.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary examples, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The examples disclosed herein are provided to enable any person skilled in the art to make or use the presently disclosed subject matter. Various modifications to these disclosed examples will be readily apparent to those skilled in the art, and the generic principles defined herein may be applied to other embodiments without departing from the teachings of the present disclosure. It is also noted that the word "exemplary" is used exclusively herein to mean "serving as an example, instance, or illustration." Any example described herein as "exemplary" is not necessarily to be construed as preferred or advantageous over other examples. Thus, the present disclosure is not intended to be limited to the examples shown herein, but is to be accorded the widest scope consistent with the principles and novel features disclosed herein.

What is claimed is:

1. A method for sensing the presence of a transmission signal type within a wireless channel in a wireless communication system, the method comprising:
   calculating a spectral density estimate of a signal on the wireless channel;
   comparing a first test value derived from the calculated spectral density estimate to a first threshold;
   making a preliminary determination of the presence of the transmission signal type if the first test value exceeds the first threshold; and
   sensing the presence of the signal type after a preliminary determination of the presence of the signal type is made by determining that an observed spectral density of a prescribed signal added to the signal on the wireless channel matches a model estimate of the spectral density of the prescribed signal by at least a predetermined degree.

2. The method as defined in claim 1, wherein determining that the observed spectral density of the prescribed signal added to the signal on the wireless channel matches the model estimate of the spectral density of the prescribed signal comprises:
   determining an observation vector based on at least two frequency peaks of a power spectral density of the prescribed signal;
   determining a model estimate observation vector of the prescribed signal based on a matrix in the observation vector where the matrix is based on a relationship between the at least two frequency peaks;
   determining a second test value based on at least a difference between the observation vector and the model estimate observation vector; and
   determining that the observed spectral density of the prescribed signal added to the channel matches the model estimate of the prescribed signal by at least the predetermined degree when the second test value is less than a second threshold.

3. The method as defined in claim 1, wherein the prescribed signal added to the signal on the wireless channel comprises a wireless microphone signal, which has been modulated by a tone-key signal.

4. The method as defined in claim 1, wherein the power spectral density estimate comprises an averaged Periodogram based on a plurality of samples of the signal on the wireless channel taken over a plurality of sensing time intervals.

5. The method as defined in claim 1, wherein the first test value comprises a ratio of a maximum value of spectral density estimate to an average value of the spectral density estimate.

6. The method as defined in claim 1, further comprising:
   determining a frequency difference between a frequency of a greatest peak in the spectral density estimate with a predetermined frequency of a known signal type; and
   validating the preliminary determination of the presence of the transmission signal type when the frequency difference exceeds a predetermined value prior to sensing the presence of the signal type.

7. The method as defined in claim 6, wherein the known signal type is a pilot of an Advanced Television Systems Committee (ATSC) signal.

8. The method as defined in claim 1, wherein the signal type is a wireless microphone signal.

9. The method as defined in claim 1, wherein sensing the presence of the transmission signal type is implemented by a cognitive radio device.

10. An apparatus operable for sensing the presence of a transmission signal type within a wireless channel in a wireless communication, the apparatus comprising:
    a memory storing instructions executable by a processor; and
    at least one processor configured to execute the instructions stored in the memory to:
       calculate a spectral density estimate of a signal on the wireless channel;
       compare a first test value derived from the calculated spectral density estimate to a first threshold, and make a preliminary determination of the presence of the transmission signal type if the first test value exceeds the first threshold; and
       sense the presence of the signal type after a preliminary determination of the presence of the signal type is made by determining that an observed spectral density of a prescribed signal added to the signal on the wireless channel matches a model estimate of the spectral density of the prescribed signal by at least a predetermined degree.

11. The apparatus as defined in claim 10, wherein the at least one processor in determining that the observed spectral density of the prescribed signal added to the signal on the wireless channel matches the model estimate of the spectral density of the prescribed signal is further configured to execute instructions stored in the memory to:
    determine an observation vector based on at least two frequency peaks of a power spectral density of the prescribed signal;
    determine a model estimate observation vector of the prescribed signal based on a matrix in the observation vector where the matrix is based on a relationship between the at least two frequency peaks;
    determine a second test value based on at least a difference between the observation vector and the model estimate observation vector; and
    determine that the observed spectral density of the prescribed signal added to the channel matches the model estimate of the prescribed signal by at least the predetermined degree when the second test value is less than a second threshold.

12. The apparatus as defined in claim 10, wherein the prescribed signal added to the signal on the wireless channel comprises a wireless microphone signal modulated by a keytone signal.

13. The apparatus as defined in claim 10, wherein the power spectral density estimate comprises an averaged Periodogram based on a plurality of samples of the signal on the wireless channel taken over a plurality of sensing time intervals.

14. The apparatus as defined in claim 10, wherein the first test value comprises a ratio of a maximum value of spectral density estimate to an average value of the spectral density estimate.

15. The apparatus as defined in claim 10, wherein the at least one processor is further configured to execute instructions stored in the memory to:
determine a frequency difference between a frequency of a greatest peak in the spectral density estimate with a predetermined frequency of a known signal type; and
validate the preliminary determination of the presence of the transmission signal type when the frequency difference exceeds a predetermined value prior to sensing the presence of the signal type.

16. The apparatus as defined in claim 15, wherein the known signal type is a pilot of an Advanced Television Systems Committee (ATSC) signal.

17. The apparatus as defined in claim 10, wherein the signal type is a wireless microphone signal.

18. The apparatus as defined in claim 10, wherein the apparatus comprises a cognitive radio device.

19. An apparatus operable for sensing the presence of a transmission signal type within a wireless channel in a wireless communication, the apparatus comprising:
means for calculating a spectral density estimate of a signal on the wireless channel;
means for comparing a first test value derived from the calculated spectral density estimate to a first threshold;
means for making a preliminary determination of the presence of the transmission signal type if the first test value exceeds the first threshold; and
means for sensing the presence of the signal type after a preliminary determination of the presence of the signal type is made by means for determining that an observed spectral density of a prescribed signal added to the signal on the wireless channel matches a model estimate of the spectral density of the prescribed signal by at least a predetermined degree.

20. The apparatus as defined in claim 19, wherein the means for determining that the observed spectral density of the prescribed signal added to the signal on the wireless channel matches the model estimate of the spectral density of the prescribed signal further comprises:
means for determining an observation vector based on at least two frequency peaks of a power spectral density of the prescribed signal;
means for determining a model estimate observation vector of the prescribed signal based on a matrix in the observation vector where the matrix is based on a relationship between the at least two frequency peaks;
means for determining a second test value based on at least a difference between the observation vector and the model estimate observation vector; and
means for determining that the observed spectral density of the prescribed signal added to the channel matches the model estimate of the prescribed signal by at least the predetermined degree when the second test value is less than a second threshold.

21. The apparatus as defined in claim 19, wherein the prescribed signal added to the signal on the wireless channel comprises a wireless microphone signal, modulated by a key-tone signal.

22. The apparatus as defined in claim 19, wherein the power spectral density estimate comprises an averaged Periodogram based on a plurality of samples of the signal on the wireless channel taken over a plurality of sensing time intervals.

23. The apparatus as defined in claim 19, wherein the first test value comprises a ratio of a maximum value of spectral density estimate to an average value of the spectral density estimate.

24. The apparatus as defined in claim 19, further comprising:
means for determining a frequency difference between a frequency of a greatest peak in the spectral density estimate with a predetermined frequency of a known signal type; and
means for validating the preliminary determination of the presence of the transmission signal type when the frequency difference exceeds a predetermined value prior to the means for sensing the presence of the signal type.

25. The apparatus as defined in claim 24, wherein the known signal type is a pilot of an Advanced Television Systems Committee (ATSC) signal.

26. The apparatus as defined in claim 19, wherein the signal type is a wireless microphone signal.

27. The apparatus as defined in claim 19, wherein the apparatus comprises a cognitive radio device.

28. A computer program product comprising:
a non-transitory computer-readable medium comprising:
code for causing a computer to calculate a spectral density estimate of a signal on the wireless channel;
code for causing the computer to compare a first test value derived from the calculated spectral density estimate to a first threshold;
code for causing the computer to make a preliminary determination of the presence of the transmission signal type if the first test value exceeds the first threshold; and
code for causing the computer to sense the presence of the signal type after a preliminary determination of the presence of the signal type is made by determining that an observed spectral density of a prescribed signal added to the signal on the wireless channel matches a model estimate of the spectral density of the prescribed signal by at least a predetermined degree.

29. The computer program product as defined in claim 28, wherein the code for causing the computer to sense the presence of the signal type by determining that the observed spectral density of the prescribed signal added to the channel matches the model estimate of the prescribed signal further comprises:
code for causing the computer to determine an observation vector based on at least two frequency peaks of a power spectral density of the prescribed signal;
code for causing the computer to determine a model estimate observation vector of the prescribed signal based on a matrix in the observation vector where the matrix is based on a relationship between the at least two frequency peaks;
code for causing the computer to determine a second test value based on at least a difference between the observation vector and the model estimate observation vector; and
code for causing the computer to determine that the observed spectral density of the prescribed signal added to the channel matches the model estimate of the prescribed signal by at least the predetermined degree when the second test value is less than a second threshold.

30. The computer program product as defined in claim 29, wherein the non-transitory computer-readable medium is utilized in a cognitive radio device.

31. The computer program product as defined in claim 28, wherein the prescribed signal added to the signal on the wireless channel comprises a wireless microphone signal, modulated by a key-tone signal.

32. The computer program product as defined in claim 28, wherein the power spectral density estimate comprises an averaged Periodogram based on a plurality of samples of the signal on the wireless channel taken over a plurality of sensing time intervals.

33. The computer program product as defined in claim 28, wherein the first test value comprises a ratio of a maximum value of spectral density estimate to an average value of the spectral density estimate.

34. The computer program product as defined in claim 28, wherein the non-transitory computer-readable medium further comprises:
　　code for causing the computer to determine a frequency difference between a frequency of a greatest peak in the spectral density estimate with a predetermined frequency of a known signal type; and
　　code for causing the computer to validate the preliminary determination of the presence of the transmission signal type when the frequency difference exceeds a predetermined value prior to sensing the presence of the signal type.

35. The computer program product as defined in claim 34, wherein the known signal type is a pilot of an Advanced Television Systems Committee (ATSC) signal.

36. The computer program product as defined in claim 28, wherein the signal type is a wireless microphone signal.

* * * * *